(12) United States Patent
Smeets

(10) Patent No.: US 6,633,979 B1
(45) Date of Patent: Oct. 14, 2003

(54) METHODS AND ARRANGEMENTS FOR SECURE LINKING OF ENTITY AUTHENTICATION AND CIPHERING KEY GENERATION

(75) Inventor: Bernhard Jan Marie Smeets, Dalby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/344,387

(22) Filed: Jun. 25, 1999

(51) Int. Cl.[7] ............................................. G06F 1/24
(52) U.S. Cl. ....................... 713/151; 713/164; 713/165
(58) Field of Search ............................... 380/247, 249; 371/171; 713/151

(56) References Cited

U.S. PATENT DOCUMENTS

| | | |
|---|---|---|
| 5,091,942 A | 2/1992 | Dent |
| 5,179,591 A * | 1/1993 | Hardy et al. ................ 713/171 |
| 5,351,293 A | 9/1994 | Michener et al. |
| 5,748,734 A * | 5/1998 | Mizikovsky ................ 380/247 |

FOREIGN PATENT DOCUMENTS

| | | |
|---|---|---|
| EP | RS 103432 | 8/1999 |
| WO | WO 96/01546 | 1/1996 |
| WO | WO 99/26124 | 5/1999 |

OTHER PUBLICATIONS

A. Menezes, P. van Oorschot, and S. Vanstone, "Challenge–Response by Symmetric–Key Techniques", Section 10.3.2., *Handbook of Applied Cryptography*, CRC Press, 1997, pp. 400–403.

* cited by examiner

Primary Examiner—Thomas R. Peeso
(74) Attorney, Agent, or Firm—Jenkens & Gilchrist, P.C.

(57) ABSTRACT

Methods and arrangements are provided for use in communications systems that allow for secure communication sessions to be conducted over a communications link between at least two nodes. An entity authentication process is conducted using a cryptography key. During the authentication process, a ciphering offset (COF) value is generated. Each node stores the COF value and uses the COF value to generate subsequent ciphering keys that are employed to encrypt data transmitted between the nodes. As such, there is a logical relationship between the latest entity authentication process and subsequently generated ciphering keys. This increases security and can be used to reduce overhead processing/delays associated with repeating the link or entity authentication process. The methods and arrangements can be employed to enhance security in any communications system, including a mobile telecommunications system, such as, for example, a global system for mobile (GSM) communications system.

29 Claims, 3 Drawing Sheets

METHODS AND ARRANGEMENTS FOR SECURE LINKING OF ENTITY AUTHENTICATION AND CIPHERING KEY GENERATION

TECHNICAL FIELD OF THE INVENTION

The present invention relates to secure communications, and more particularly to methods and arrangements that provide a logical relationship between entity authentication processes and ciphering key generation processes during a secure communication.

BACKGROUND

Secure communications, for example, between two nodes in a communications system, typically require that at least an initial authentication process be conducted to ensure that the connected nodes are authorized to conduct the secure communications. This initial authentication process allows the nodes to establish that they are indeed establishing a communications link with the correct counterpart node, is secure enough prior to transmitting data. Additional authentication processes can be conducted at various times during a secure communication session to further verify that the nodes are legitimate and that the link is still secure.

In this manner, the authentication processes are designed to provide the communicating nodes with a reasonable level of protection against potential eaves-droppers, impersonators, and/or hijackers (spoofers) that may attempt to steal the transmitted data.

By way of example, in certain conventional communications systems protection is provided against such unauthorized entities by combining authentication processes with data encryption processes. The authentication processes typically employs a challenge response scheme through which the nodes prove to each other that they have a common secretly shared key or public/private cryptography pair. The challenge/response is also used as input to a ciphering key generator to produce the ciphering key that is used for the encryption of the data subsequently transmitted over the authenticated link.

Depending upon the needs of the parties, the authentication process can be either mutual or one-way. In a mutual authentication process, each of the nodes will challenge the other node by sending a challenge message that requires a response message generated using the secret key. In a one-way authentication process, only one of the nodes challenges the other node.

In either case, there is a requisite level of message traffic that needs to be exchanged between the two nodes. This additional message traffic tends to reduce the efficiency of the communications, since during an authentication process no data is transmitted. This additional "overhead" can become burdensome when there is a need to conduct a plurality of link authentication processes during a communications session. For example, if the parties to the secure transaction require that the ciphering key be changed every minute, then a new link authentication process would usually be required each minute, or the ciphering key would otherwise be generated without re-verifying that the other node is authorized.

Consequently, it would be desirable to have new methods and arrangements that would reduce the overhead associated with this type of secure communications. Preferably, the methods and arrangements will provide for a significantly trusted secure link, while reducing the amount of overhead message traffic associated with maintaining the trust between the communicating nodes.

SUMMARY

In accordance with certain aspects of the present invention, new methods and arrangements are provided for use in a communications system that tend to reduce the overhead associated with repeated entity authentication processes.

Thus, for example, a method for generating ciphering keys in a secured link set-up between a first node and a second node is provided, in accordance with certain embodiments of the present invention. The method includes the steps of conducting an authentication process between the first node and the second node using a cryptography key and related techniques, generating a ciphering offset value during the authentication process, storing the ciphering offset value in each of the nodes, and subsequently generating a ciphering key in each of the nodes using at least one random input value, the cryptography key and the ciphering offset value. In this manner, the ciphering key, which can be used to encrypt and decrypt transmitted data, is logically related to the authentication process. In certain further embodiments, the first node is a base station and the second node is a mobile station, each of which are each part of a mobile telecommunications system, such as, for example, an enhanced global system for mobile (GSM) communications system.

The above stated needs and others are also met by an arrangement for generating ciphering keys in a communications node, in accordance with certain embodiments of the present invention. The arrangement includes memory that is configured to store data, a transceiver that can be configured to send and receive data over a communications link, and a processor that is connected to the memory and the transceiver. The arrangement is configured to conduct an authentication process over the communications link with an external communications node using a cryptography key, generate a ciphering offset value during the authentication process, store the ciphering offset value in memory, and subsequently generating a ciphering key using at least one generated random input value, the cryptography key and the ciphering offset value.

In accordance with still other embodiments of the present invention a communication system is provided. The communication system includes a communications link that is connected between a first node and a second node. Both the first and second nodes are configured to send and receive data over the communications link, conduct an authentication process over the communications link using a cryptography key, generate a ciphering offset during the link authentication process, store the ciphering offset, and subsequently generate a ciphering key using at least one generated random input value, the cryptography key and the ciphering offset. As such, the resulting ciphering key is logically related to the authentication process.

BRIEF DESCRIPTION OF THE DRAWINGS

A more complete understanding of the various methods and arrangements of the present invention may be had by reference to the following detailed description when taken in conjunction with the accompanying drawings wherein.

DETAILED DESCRIPTION

Figure 1:
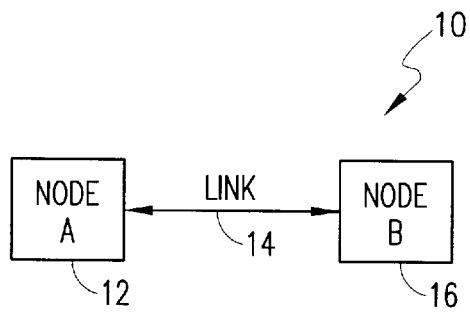
FIG. 1 is a block diagram depicting an exemplary communications system providing a secure link between two nodes.

FIG. 1 shows a communications system 10 that is configured to provide secure communications between two nodes. Communications system 10 includes a first node 12 (node A), a communications link 14 and a second node 16 (node B). Nodes 12 and 16 are both connected to link 14 and configured to send and receive data over link 14. Link 14 can include one or more connections, networks, or other communication resources.

Figure 2:
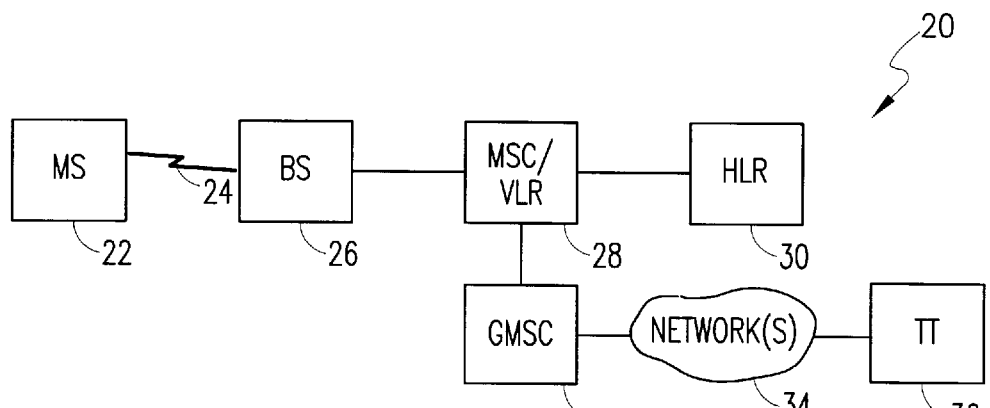
FIG. 2 is a block diagram depicting an exemplary mobile telecommunications system providing a secure radio interface link between a base station node and a mobile station node.

FIG. 2 shows an exemplary mobile telecommunications system 20, such as, for example, a global system for mobile (GSM) communications system, having a mobile station (MS) 22 (e.g., a cellular telephone) that is configured to communicate over a secure radio interface link 24 to a base station (BS) 26. Thus, MS 22 is similar to node 12 and BS 26 is similar to node 16, in depicted FIG. 1. As such, MS 22 is able to transmit up-link signals to BS 26 and BS 26 is able to transmit down-link signals to MS 22, in a secure manner over radio interface link 24.

BS 26 is further connected to a mobile switching center/visitor location register (MSC/VLR) 28. MSC/VLR 28 provides communications services to the subscriber associated with MS 22 as defined by a home location register (HLR) 30. For example, MSC/VLR 28 can provide for calls between MS 22 and a remote telecommunications terminal (TT) 36, through a gateway mobile switching center (GMSC) 32 and one or more networks 34.

Figure 3:
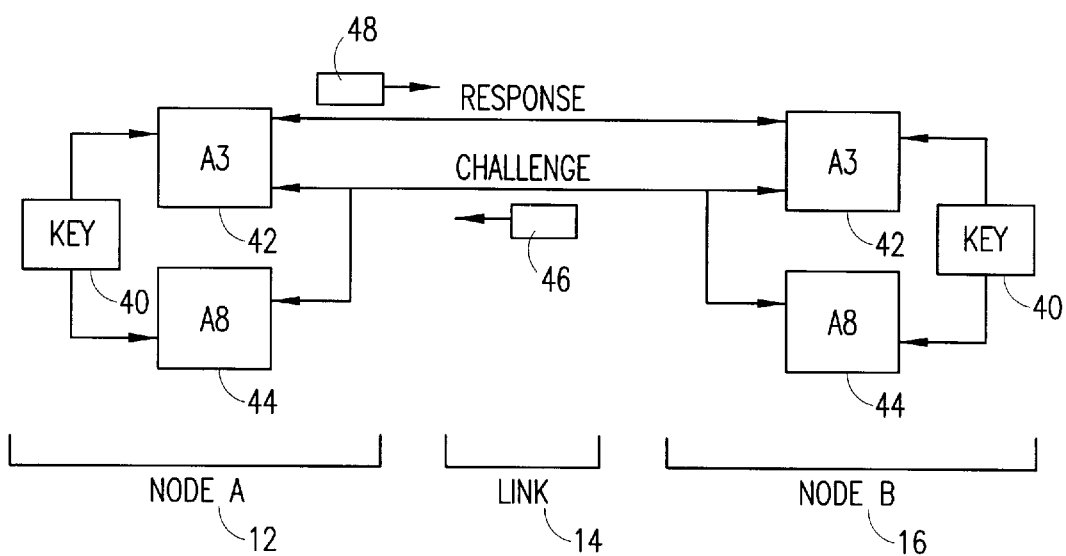
FIG. 3 is a block diagram depicting a conventional authentication process and arrangement associated with a secure communications system, for example, as in FIGS. 1 and 2.

FIG. 3 shows an exemplary conventional authentication process and arrangement suitable for use in communications systems 10 and 20, above.

As depicted in FIG. 3, within each of nodes 12 and 16 there is a cryptography key 40. Cryptography key 40 is a key that has been previously agreed to and provided to the parties seeking to conduct secure communication sessions over link 14. Thus, for example, cryptography key 40 can be a secret key or a public/private key pair.

Cryptography key 40 is provided, within each node (12 and 16), to an authentication unit (A3) 42 and a ciphering key generator (A8) 44. Authentication unit 42 is configured to perform an authentication process by sending/receiving a challenge message 46 over link 14 and sending/receiving a challenge response message 48 over link 14. Upon receiving a challenge message over link 14, an authentication unit 42 outputs a response message 48 that is generated using cryptography key 40. Upon receiving a response message, an authentication unit 42 will process the received data and verify that the sending node had used cryptography key 40 to generate response message 48. As described above, the authentication process can be one-way or mutual (both ways), and can be conducted initially, randomly, periodically, etc., as deemed necessary.

Following a successful authentication process, ciphering key generator 44 generates a ciphering key using a random input value (e.g., a challenge value) and cryptography key 40, for example. The ciphering key is then used to encrypt data prior to transmitting the data over link 14, and decrypt received data. Preferably, the ciphering key is computed immediately after (or in parallel with) the computation of the response in the authentication process.

At some point during a secure communication session it may be necessary to generate a new ciphering key to ensure that security is maintained. For example, nodes 12 and/or 16 can be configured to require generation of a new ciphering key after a certain amount of time has passed, and/or data has been transmitted.

The usual procedure is for one of the nodes to send a new random challenge value in a challenge message 46, which is then used (following successful completion of the latest authentication process) to compute a new ciphering key. In certain systems, an abbreviated authentication process is preformed, wherein there is no need to send a response message 48. While this type of abbreviated authentication process reduces overhead and allows for new ciphering keys to be generated, it has the disadvantage that the new ciphering keys are no longer related (i.e., logically) to the authentication performed at the beginning of the secure communications session.

In accordance with certain aspects of the present invention, this potential loss of security is avoided by various methods and arrangements that keep the ciphering keys logically related to the previously conducted authentication process, without requiring significant additional overhead time/processing.

Figure 4:
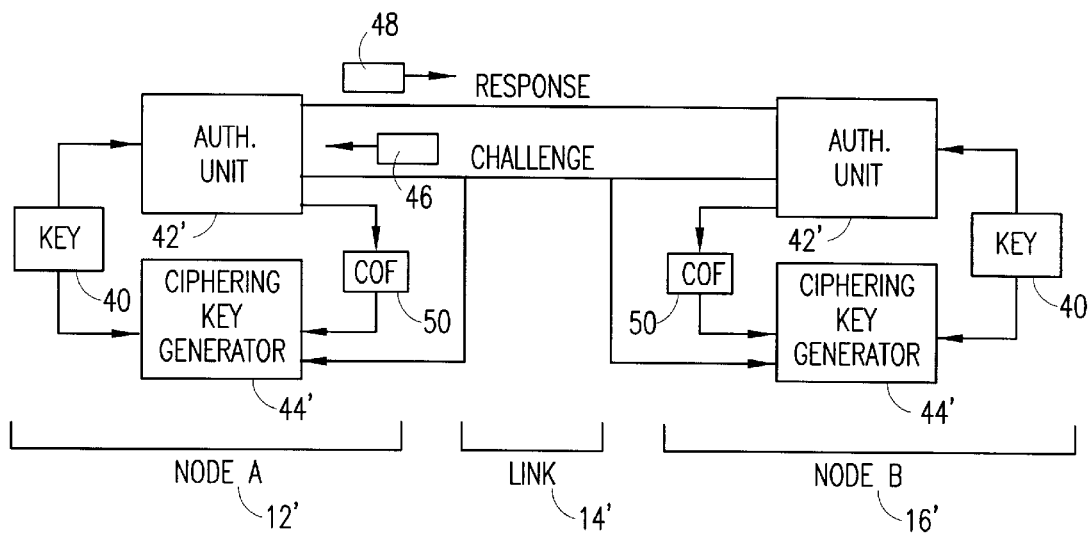
FIG. 4 is a block diagram depicting an improved authentication process and arrangement associated with a secure communications system, for example, as in FIGS. 1 and 2, in accordance with certain embodiments of the present invention.

With this in mind, FIG. 4 depicts an exemplary improved authentication process and arrangement that is suitable for use in communications systems 10 and 20, above, in accordance with certain embodiments of the present invention.

As shown, within node 12' there is provided an improved authentication unit 42' and ciphering key generator 44'. Authentication unit 42' is configured as is authentication unit 42 (above) with the additional capability of generating a ciphering offset (COF) 50 during an initial or full authentication process. COF 50 can be any string of bits, for example, that is stored for future use in ciphering key generator 44'. Preferably, COF 50 is generated using ciphering key 40. When COF 50 is subsequently used by ciphering key generator 44', the resulting ciphering key will be logically related to the authentication process. This tends to enhance the trust/reliability of security in link 14.

Consequently, the payloads carrying the data over link 14 are encrypted with a ciphering key that is logically related to the authentication process performed, for example, when the communication session between the communicating nodes initialized.

Figure 5:
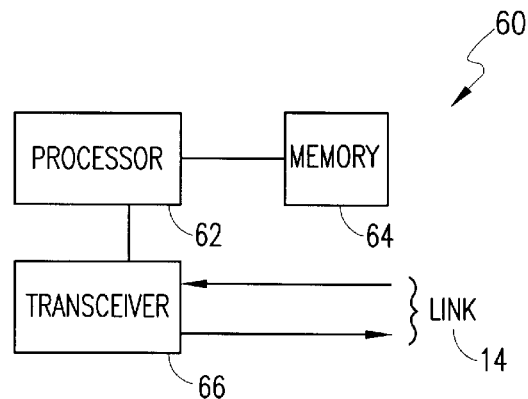
FIG. 5 is a block diagram depicting an exemplary arrangement associated with node within a secure communications system, for example, as in FIG. 4, in accordance with certain embodiments of the present invention.

This novel authentication process not only performs the authentication procedure but also produces a COF 50 value that each of the nodes remembers. For example, in FIG. 5 an arrangement 60 is shown for use in nodes 12' and 16'. Arrangement 60 includes a processor 62 connected to a memory 64 and a transceiver 66. Processor 62 is configured to perform the processes associated with authentication unit 42' and ciphering key generator 44' using the storage capability of memory 64 and the communication capabilities of transceiver 66. Thus, for example, processor 62 can generate (or otherwise provide) and store COF 50 in memory 64 during an initial or subsequent authentication process. Then, processor 62 can access COF 50 to later generate new ciphering keys as needed.

Figure 6:
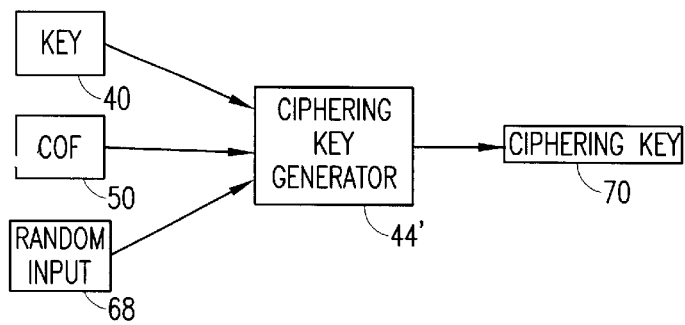
FIG. 6 is a block diagram depicting an exemplary functional arrangement associated with node within a secure communications system, for example, as in FIG. 4, in accordance with certain embodiments of the present invention.

As shown in FIG. 6, COF 50 is used by ciphering key generator 44', along with cryptography key 40 and a random input value 68, to generate (or otherwise provide) a ciphering key 70. Ciphering key 70 can then be used, for example, by processor 62 to encrypt data prior to transmission by transceiver 66 over link 14.

As such, a logical relationship is maintained between the encrypted data and the latest authentication process. Hence the cryptographical binding of the link security and the entity authentication is strengthened and the potential for link hijacking or spoofing, etc., is significantly reduced.

The methods and arrangements can be used for one-way and/or mutual link authentication processes, that use either public key based cryptographic techniques or secret key based cryptographic techniques.

Figure 7:
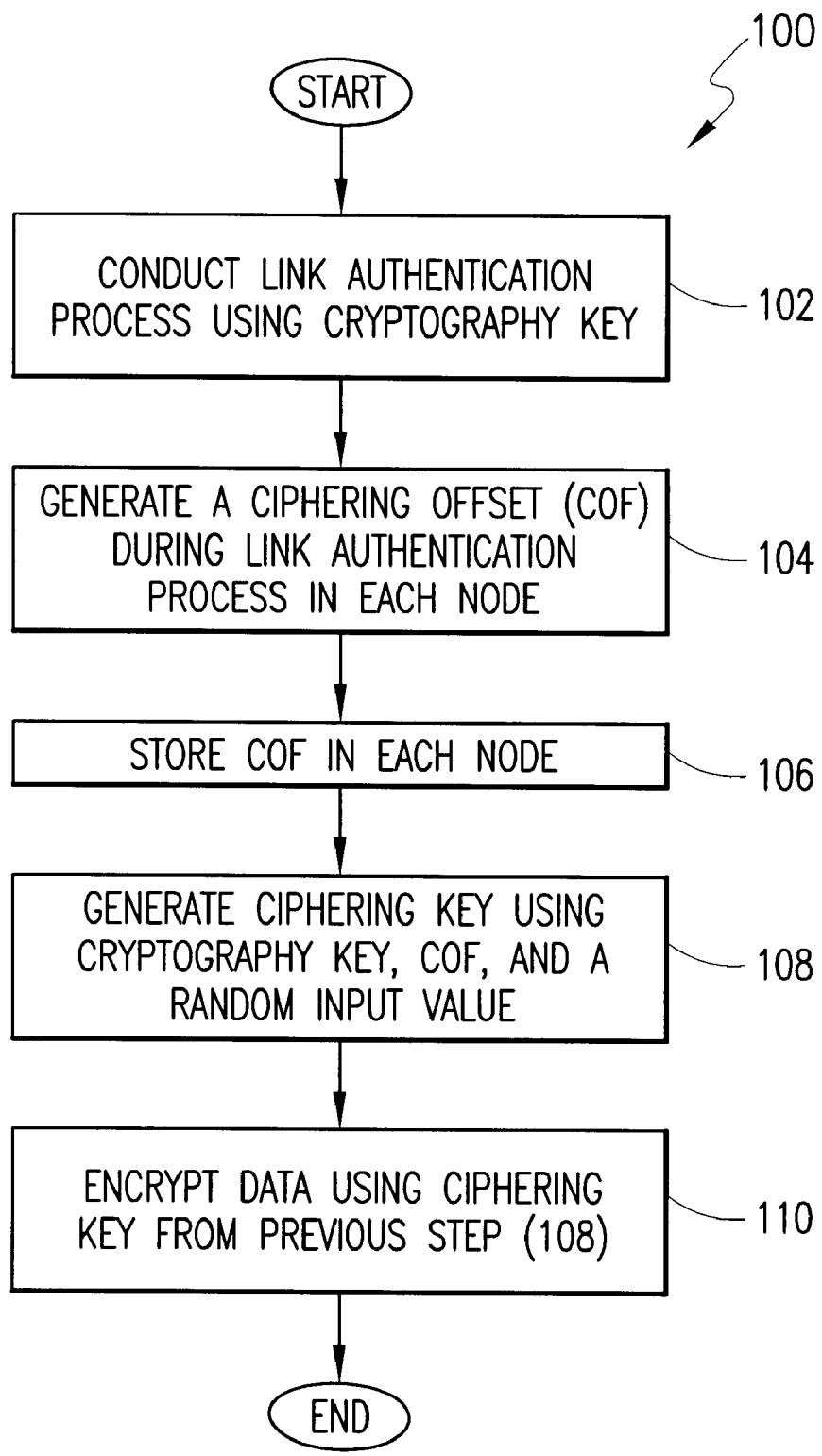
FIG. 7 is a flow-chart depicting an exemplary authentication and ciphering key generation process for use in a secure communications system, in accordance with certain embodiments of the present invention.

With this in mind, FIG. 7 depicts an exemplary authentication and ciphering key generation process 100 for use in a secure communications system 10, in accordance with certain embodiments of the present invention.

In step 102 of process 100, an authentication process is conducted using a cryptography key 40. In step 104, a ciphering offset (COF) 50 is generated or otherwise provided in each node 12' and 16'. In step 106, a COF 50 value is stored in each node 12' and 16'. Next, in step 108, a ciphering key 70 is generated using cryptography key 40, the COF 50 value, and a random input 68 value. In step 110, data that is to be transmitted over link 14 is encrypted or otherwise encoded using ciphering key 70 as generated in step 108.

Although some preferred embodiments of the methods and arrangements of the present invention have been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for generating ciphering keys in a secured link set-up between a first node and a second node, the method comprising the steps of:
   conducting an authentication process between the first and second nodes using a cryptography key;
   generating a ciphering offset during the authentication process;
   storing the ciphering offset in each of the first and second nodes; and
   subsequently generating a ciphering key in both the first and second nodes, using at least one random input value, the cryptography key and the ciphering offset, such that the ciphering key is logically related to the authentication process.

2. The method as recited in claim 1, further comprising the step of encrypting data transmitted between the first and second nodes, using the ciphering key.

3. The method as recited in claim 2, further comprising the steps of:
   periodically generating a new ciphering key using at least one new random input value, the cryptography key and the ciphering offset, such that the new ciphering key is logically related to the authentication process; and
   encrypting data transmitted between the first and second nodes, using the new ciphering key.

4. The method as recited in claim 1, wherein the step of conducting an authentication process further includes the steps of:
   providing the cryptography key to the first node and the second node; and
   causing the first node to verify that the second node has the cryptography key.

5. The method as recited in claim 4, wherein the step of conducting an authentication process further includes the step of causing the second node to verify that the first node has the cryptography key.

6. The method as recited in claim 1, wherein the cryptography key is a secret key.

7. The method as recited in claim 1, wherein the cryptography key is part of a public/private key pair.

8. The method as recited in claim 1, wherein the first node is a base station and the second node is a mobile station, which are each part of a mobile telecommunications system.

9. The method as recited in claim 8, wherein the mobile telecommunications system is a global system for mobile (GSM) communications system.

10. An arrangement for generating ciphering keys in a communications node, the arrangement comprising:
    memory configured to store data;
    a transceiver configurable to send and receive data over a communications link; and
    a processor connected to the memory and the transceiver, and configured to conduct an authentication process over the communications link with an external communications node using a cryptography key, generate a ciphering offset during the authentication process, store the ciphering offset in the memory, and subsequently generate a ciphering key using at least one generated random input value, the cryptography key and the ciphering offset, such that the ciphering key is logically related to the authentication process.

11. The arrangement as recited in claim 10, wherein the processor is further configured to encrypt data, using the ciphering key, prior to providing the data to the transceiver for transmission over the communications link.

12. The arrangement as recited in claim 11, wherein the processor is further configured to periodically generate a new ciphering key using at least one newly generated random input value, the cryptography key and the ciphering offset, such that the new ciphering key is logically related to the authentication process, and wherein the processor is further configured to encrypt data, using the new ciphering key, prior to providing the data to the transceiver for transmission over the communications link.

13. The arrangement as recited in claim 10, wherein the processor is further configured to verify that the external communications node has the cryptography key during the authentication process.

14. The arrangement as recited in claim 13, wherein the processor is further configured to respond to a verification challenge received from the external communications node, using the cryptography key.

15. The arrangement as recited in claim 10, wherein the cryptography key is a secret key.

16. The arrangement as recited in claim 10, wherein the cryptography key is part of a public/private key pair.

17. The arrangement as recited in claim 10, wherein the communications node is part of a mobile telecommunications system.

18. The arrangement as recited in claim 17, wherein the communications node is selected from a group of nodes within the mobile telecommunications system comprising a base station, and a mobile station.

19. The arrangement as recited in claim 18, wherein the mobile telecommunications system is a global system for mobile (GSM) communications system.

20. The system as recited in claim 18, wherein the mobile telecommunications system is a global system for mobile (GSM) communications system.

21. A system comprising:

a communications link;

a first node connected to the communications link and configured to send and receive data over the communications link, conduct an authentication process over the communications link using a cryptography key, generate a ciphering offset during the authentication process, store the ciphering offset, and subsequently generate a ciphering key using at least one generated random input value, the cryptography key and the ciphering offset; and a second node connected to the communications link and configured to send and receive data over the communications link, conduct the authentication process with the first node over the communications link using the cryptography key, generate the ciphering offset during the authentication process, store the ciphering offset, and subsequently generate the ciphering key using at least one generated random input value, the cryptography key and the ciphering offset, such that the ciphering key is the same in both the first node and second node and logically related to the authentication process.

22. The system as recited in claim 21, wherein both the first and second nodes are further configured to encrypt data, using the ciphering key, prior sending the data over the communications link.

23. The system as recited in claim 22, wherein both the first and second nodes are further configured to periodically generate a new ciphering key using at least one newly generated random input value, the cryptography key and the ciphering offset, such that the new ciphering key remains logically related to the authentication process, and wherein both the first and second nodes are further configured to encrypt data, using the new ciphering key, prior sending the data over the communications link.

24. The system as recited in claim 21, wherein both the first node is further configured to verify that the second node has the cryptography key during the authentication process.

25. The system as recited in claim 24, wherein the second node is further configured to verify that the first node has the cryptography key during the authentication process.

26. The system as recited in claim 21, wherein the cryptography key is a secret key.

27. The system as recited in claim 21, wherein the cryptography key is part of a public/private key pair.

28. The system as recited in claim 21, wherein the first and second nodes are part of a mobile telecommunications system.

29. The system as recited in claim 28, wherein the first node is a base station and the second node is a mobile station.

* * * * *